US012004628B2

(12) United States Patent
Ficcadenti et al.

(10) Patent No.: US 12,004,628 B2
(45) Date of Patent: Jun. 11, 2024

(54) CONTAINER PROVIDED WITH A DISPENSER OF THE AIRLESS TYPE FOR A COSMETIC PRODUCT

(71) Applicant: BARALAN INTERNATIONAL S.P.A., Trezzano sul Naviglio (IT)

(72) Inventors: Maurizio Ficcadenti, Milan (IT); Roland Baranes, Milan (IT)

(73) Assignee: BARALAN INTERNATIONAL S.P.A., Trezzano sul Naviglio (IT)

( * ) Notice: Subject to any disclaimer, the term of this patent is extended or adjusted under 35 U.S.C. 154(b) by 243 days.

(21) Appl. No.: 17/623,806

(22) PCT Filed: Jul. 6, 2020

(86) PCT No.: PCT/IB2020/056339

§ 371 (c)(1),
(2) Date: Dec. 29, 2021

(87) PCT Pub. No.: WO2021/001811

PCT Pub. Date: Jan. 7, 2021

(65) Prior Publication Data

US 2022/0240641 A1 Aug. 4, 2022

(30) Foreign Application Priority Data

Jul. 4, 2019 (IT) ........................ 102019000010878

(51) Int. Cl.
*A45D 33/02* (2006.01)
*B05B 11/10* (2023.01)

(52) U.S. Cl.
CPC .......... *A45D 33/02* (2013.01); *B05B 11/1043* (2023.01); *A45D 2200/056* (2013.01)

(58) Field of Classification Search
CPC .. A45D 33/02; A45D 2200/056; A45D 34/00; A45D 2200/054; A45D 2200/057;
(Continued)

(56) References Cited

U.S. PATENT DOCUMENTS 6,705,493 B1 * 3/2004 Mijers ................. B05B 11/1015 222/321.7
8,556,130 B2 * 10/2013 Law .................... B05B 11/1047 222/256

(Continued)

FOREIGN PATENT DOCUMENTS

CN 2767359 Y 3/2006
CN 102756853 A 10/2012

(Continued)

OTHER PUBLICATIONS

International Search Report and Written Opinion for PCT/IB2020/056339 (Oct. 5, 2020).

(Continued)

*Primary Examiner* — Vishal Pancholi
(74) *Attorney, Agent, or Firm* — Merchant & Gould P.C.

(57) ABSTRACT

A container includes an airless dispenser for a cosmetic product. The container includes a hollow vessel body defining a sealed receptacle for containing a cosmetic product and a base. A dispensing head mounts at one end of the container and communicates with the receptacle for dispensing the cosmetic product. An actuator is associated with the dispensing head and configured to be operable to cause a pressure drop inside the receptacle. An outlet nozzle allows dispensing a desired quantity of cosmetic product when the actuator is operated. A plunger slidably and sealably mounts in the receptacle and is pushed from a spaced-out position towards a closer position relative to the outlet nozzle due to the pressure drop generated by operating the actuator. The hollow vessel body is made of glass, is substantially cylindrical, and defines a substantially constant cross-section through the axial segment in which the plunger is slidable.

16 Claims, 14 Drawing Sheets

(58) Field of Classification Search
CPC ............... B05B 11/1043; B05B 11/028; B05B 11/1047; B65D 47/20
USPC .............................. 222/326, 372, 386, 386.5
See application file for complete search history.

(56) References Cited

U.S. PATENT DOCUMENTS

| | | | | |
|---|---|---|---|---|
| 9,072,876 | B2 * | 7/2015 | Nordsiek | A61K 47/10 |
| 9,149,823 | B2 * | 10/2015 | Decottignies | B05B 11/028 |
| 2006/0255071 | A1 * | 11/2006 | Behar | B05B 11/1076 222/256 |
| 2007/0175917 | A1 * | 8/2007 | Bonney | B05B 11/1001 222/14 |
| 2012/0267398 | A1 | 10/2012 | Lim | |
| 2015/0239003 | A1 | 8/2015 | Adam | |
| 2018/0020807 | A1 | 1/2018 | Villarreal et al. | |
| 2019/0255547 | A1 * | 8/2019 | Goettke | B05B 11/007 |

FOREIGN PATENT DOCUMENTS

| | | | |
|---|---|---|---|
| CN | 104781015 | A | 7/2015 |
| CN | 105848788 | A | 8/2016 |
| CN | 107021292 | A | 8/2017 |

OTHER PUBLICATIONS

Office Action and Search Report for Chinese Patent Application No. 202080049761.X (Aug. 3, 2023).

* cited by examiner

CONTAINER PROVIDED WITH A DISPENSER OF THE AIRLESS TYPE FOR A COSMETIC PRODUCT

This application is a National Stage Application of International Application No. PCT/IB2020/056339, filed Jul. 6, 2020, which claims benefit of Serial No. 102019000010878, filed Jul. 4, 2019, in Italy and which applications are incorporated herein by reference. To the extent appropriate, a claim of priority is made to each of the above-disclosed applications.

TECHNICAL FIELD

The present invention relates to a container provided with a dispenser of the airless type for a cosmetic product.

BACKGROUND ART

In the field of cosmetic products it is known to use vessels for a cosmetic product, which is typically contained therein in a plurality of doses. For preserving the cosmetic product with reduced utilization of preservatives, airless (or airtight) dispensers have been conceived, which generally employ a mechanical vacuum pump that controls the movement of a plunger capable of pushing the cosmetic product contained in a chamber towards the discharge nozzle, while keeping the cosmetic product sealably enclosed in the chamber to avoid any contamination.

In this way, the airless dispenser effects the distribution of the cosmetic product while keeping the non-dispensed product part unaffected by air.

By way of example, FIG. 28 shows a container provided with an airless dispenser according to the prior art, wherein the container consists of a hollow vessel body made of plastic material. In particular, the hollow vessel body is manufactured by moulding a thermoplastic material.

SUMMARY OF THE INVENTION

It is one object of the present invention to provide a container provided with a dispenser of the airless type for a cosmetic product which improves and overcomes the drawbacks of the prior art.

According to the present invention, this and other objects are achieved through a container having the technical features set out in the appended independent claim.

In particular, such technical features include that the container has a hollow vessel body made of glass (e.g. vial glass). Moreover, the hollow vessel body is substantially cylindrical and defines a substantially constant cross-section through the axial section in which a plunger can sealably slide, without allowing any air to pass.

Such technical features allow obtaining a container that is compatible with volatile substances and essences which, in the cosmetics field, need to be contained within amorphous material. In fact, in this field it is generally known to use containers of the airless type with hollow vessel bodies made of plastic material—which is not the ideal choice for some cosmetic products. For example, some cosmetic products are highly volatile and chemically aggressive, such that they do not allow the use of containers made of transparent plastic material; this is an important aspect in the cosmetics field. At the same time, the above technical features make it possible to obtain, within the hollow vessel body of the container, a constant cross-section and adequate tolerances throughout its height, thus permitting the plunger to rise due to the pressure drop caused by actuating means (which substantially make a pump-type mechanical system).

According to a preferred aspect, the outlet nozzle is carried by one between said dispenser and the base; the plunger is provided with coupling means that couple the plunger to, making it integral with, one between the dispenser and the base carrying the outlet nozzle, when the plunger is in the closer position; when the plunger is in the closer position, the plunger and the dispenser or the base which is coupled thereto form an integral assembly that is extractable as one piece from the hollow vessel body.

Although reference is made in the text to a container for cosmetic products, the protection scope of the invention is also extendable to containers for other products having similar necessities and requirements.

It is understood that the appended claims are an integral part of the technical teachings provided in the following detailed description of the present invention. In particular, the appended dependent claims define some preferred embodiments of the present invention that include some optional technical features.

Further features and advantages of the present invention will become apparent in light of the following detailed description, provided merely as a non-limiting example and referring, in particular, to the annexed drawings as summarized below.

DETAILED DESCRIPTION OF THE INVENTION

Figure 2:
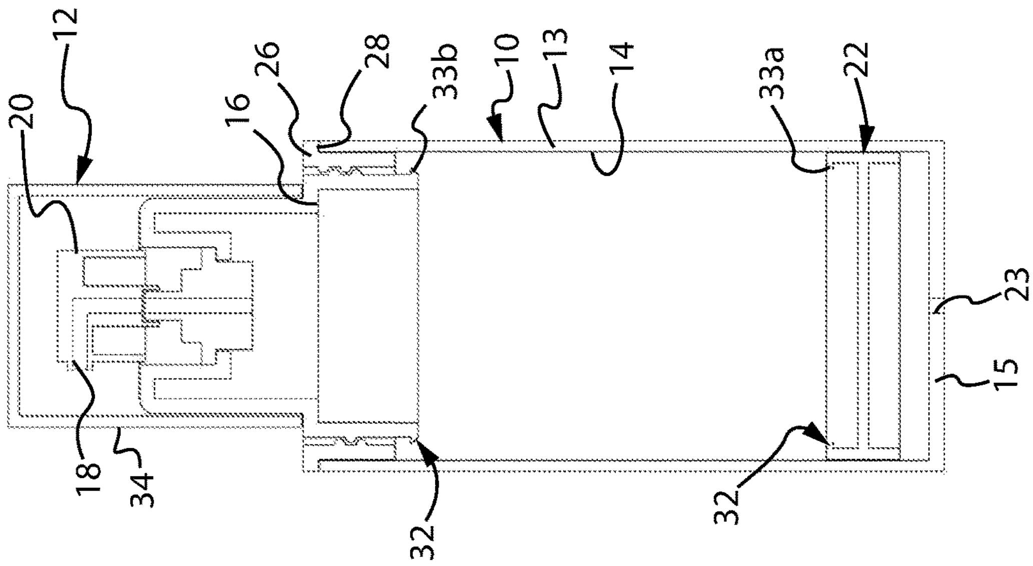
FIGS. 2 to 8 are longitudinal sectional views, each one showing a construction variant of the embodiment shown in FIG. 1.

With reference to the drawings, numeral 10 designates as a whole a container provided with a dispenser 12 of the airless type for a cosmetic product, made in accordance with an exemplary embodiment of the present invention.

Each one of the figures shows a container 10 made in accordance with an exemplary embodiment, and/or a construction variant thereof, of the present invention.

In each one of the embodiments and construction variants of the present invention illustrated herein, the container 10 comprises a hollow vessel body 13 internally defining a receptacle 14 configured for sealably containing a cosmetic product. Typically, the cosmetic product is contained therein in a plurality of doses, which can be dispensed at successive times by the dispenser. For example, the hollow vessel body 13 is shaped as a flacon.

In each one of the embodiments and construction variants of the present invention illustrated herein, the container comprises a base 15 intended to rest on a supporting surface.

In each one of the embodiments and construction variants of the present invention illustrated herein, the dispenser 12 comprises a dispensing or pumping head 16 mounted at one end of the container 10 and communicating with the receptacle 14 for dispensing the cosmetic product. The dispensing or pumping head 16 is preferably mounted to the top of the container 10. For example, the dispensing head 16 is made of plastic material.

In each one of the embodiments and construction variants of the present invention illustrated herein, there is also an outlet nozzle 18 configured for letting out the desired quantity of cosmetic product upon an actuation of the dispensing or pumping head 16 performed by a user. Such actuation occurs via actuating means 20 which are associated with the dispensing or pumping head 16 and which cause a pressure drop inside the receptacle 14. Typically, the delivery of a dosed quantity of cosmetic product corresponds to a single actuation of the actuating means 20. In particular, such actuation is effected by pressing the actuating means 20.

In each one of the embodiments and construction variants of the present invention illustrated herein, the container 10 further comprises a plunger 22 slidably and sealably mounted in the receptacle 14 and configured to be pushed towards the outlet nozzle 18 due to the pressure drop generated by the operation of the actuating means 20. In particular, the plunger 22 is movable in the receptacle 14 from a spaced-out position to a closer position relative to the outlet nozzle 18. In general, the spaced-out position corresponds to a condition in which the receptacle 14 is substantially full of cosmetic product; on the contrary, the closer position corresponds to a condition in which the receptacle 14 is substantially emptied of the cosmetic product.

For example, the plunger 22 is made of plastic material and sealably adheres to the inner surface of the sidewalls of the hollow vessel body 13.

Figure 1:
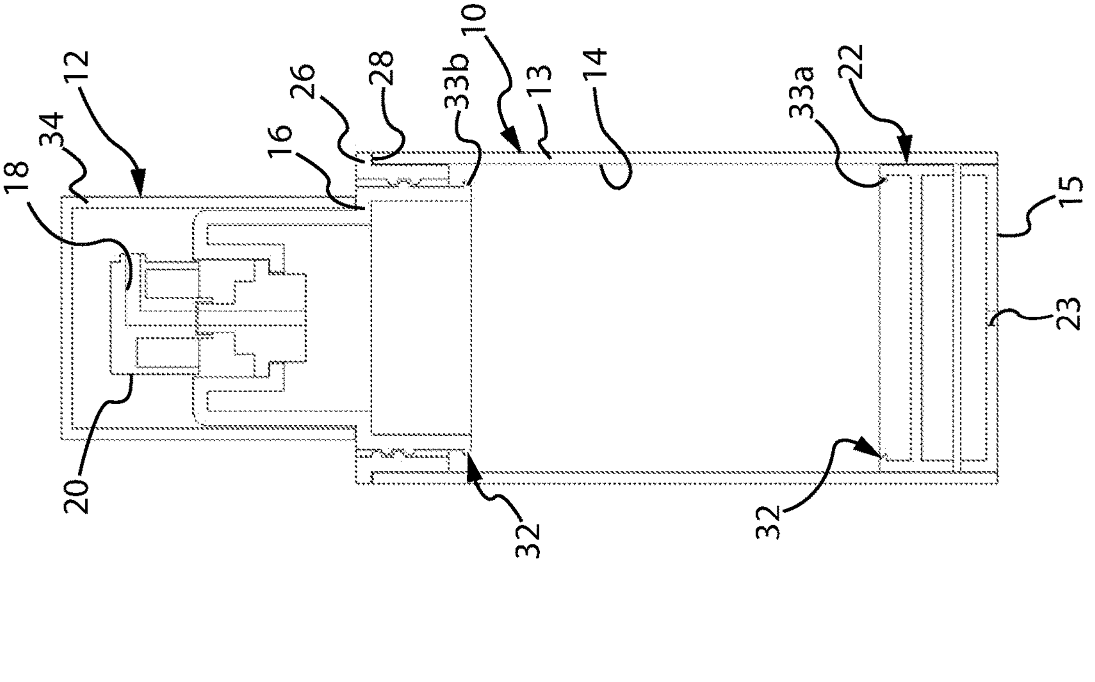
FIG. 1 is a longitudinal sectional view of a container provided with an airless dispenser for a cosmetic product made in accordance with an exemplary embodiment of the present invention.
Figure 4:
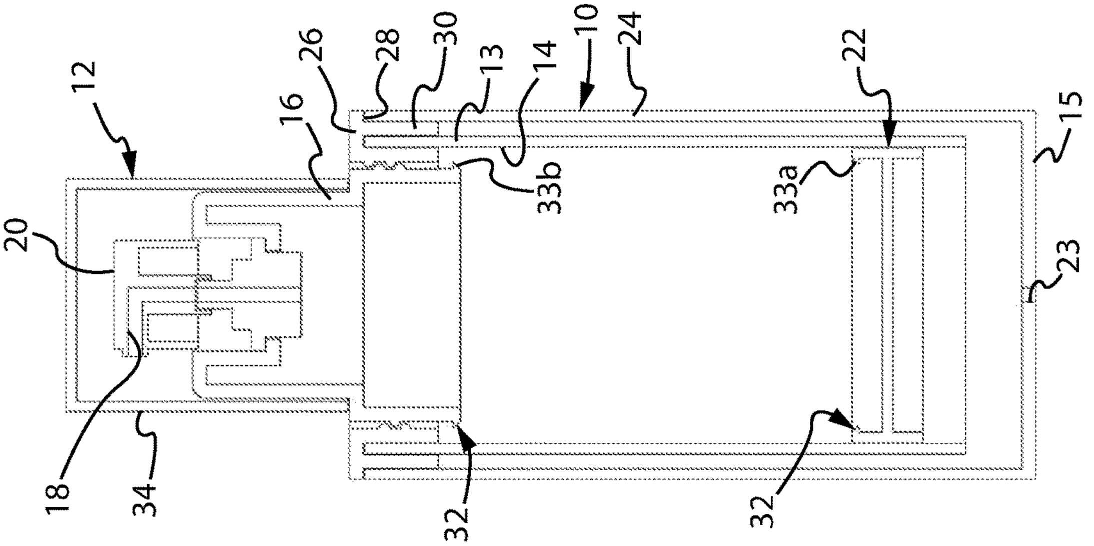
Figure 3:
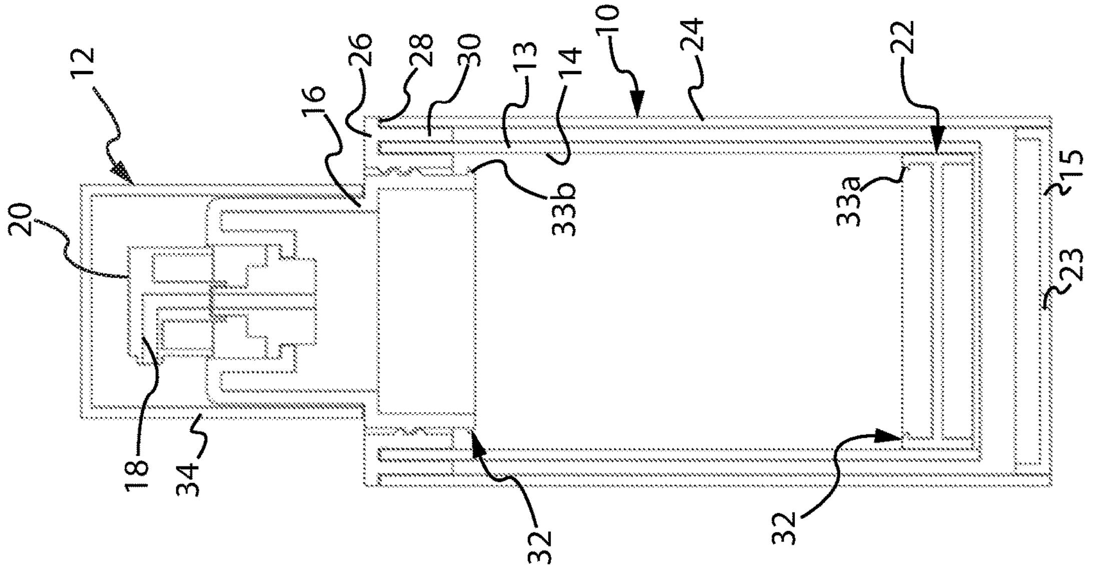
Figure 6:
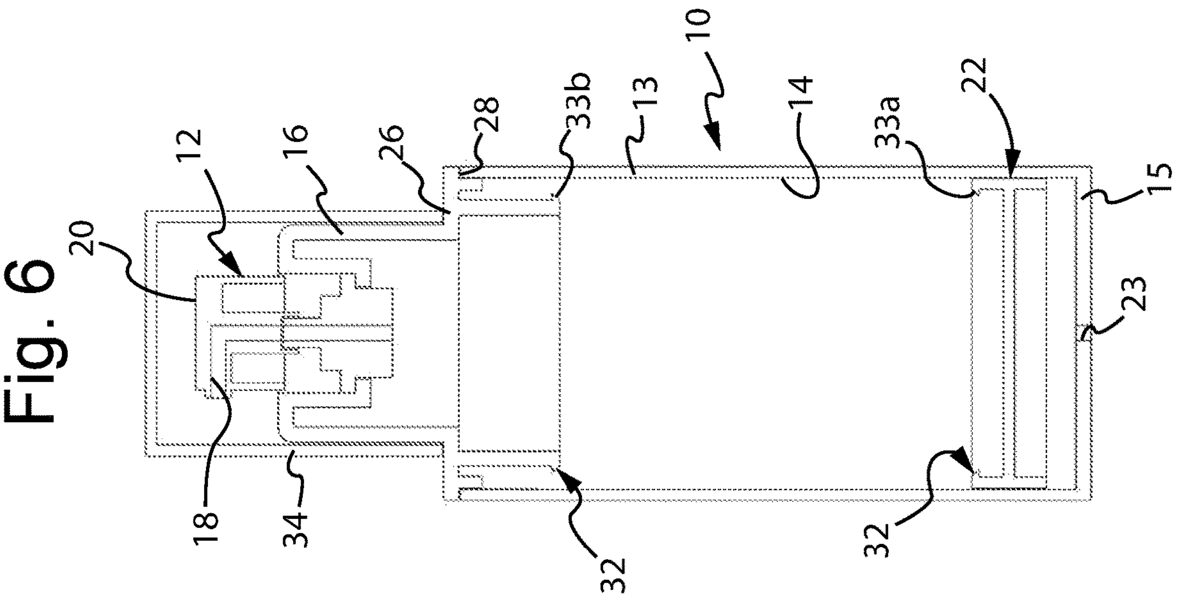
Figure 5:
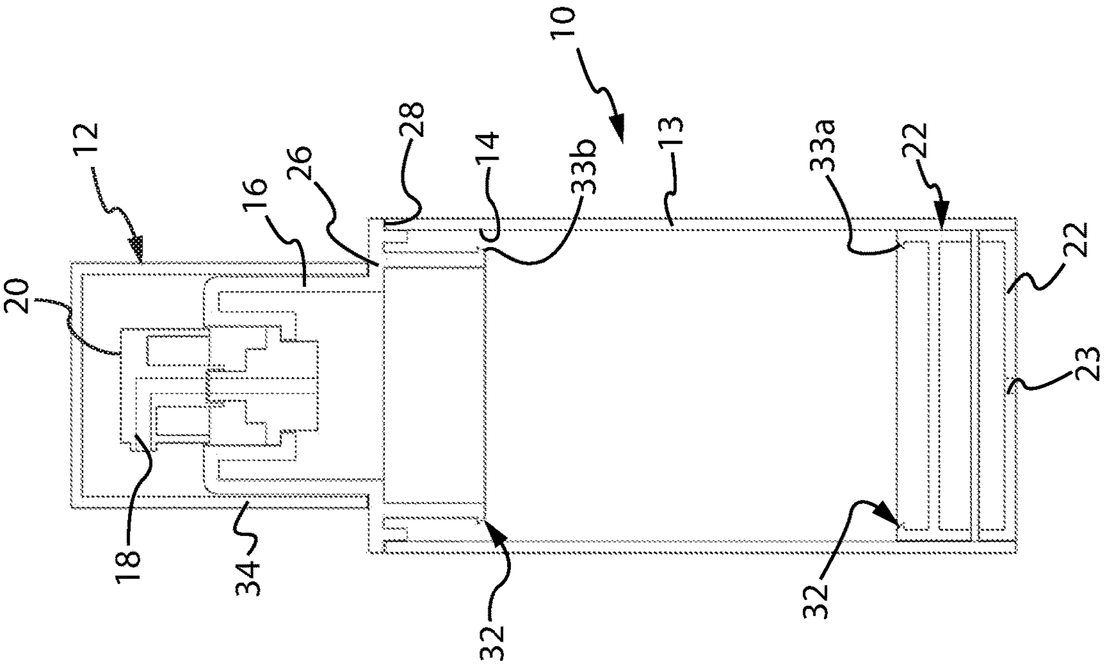
Figure 8:
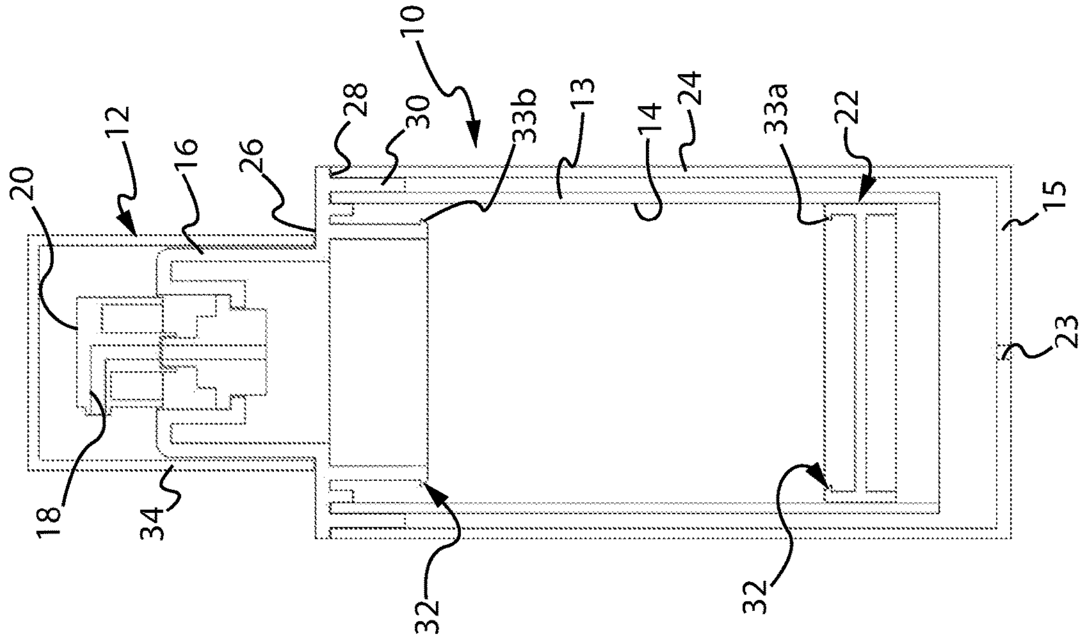
Figure 7:
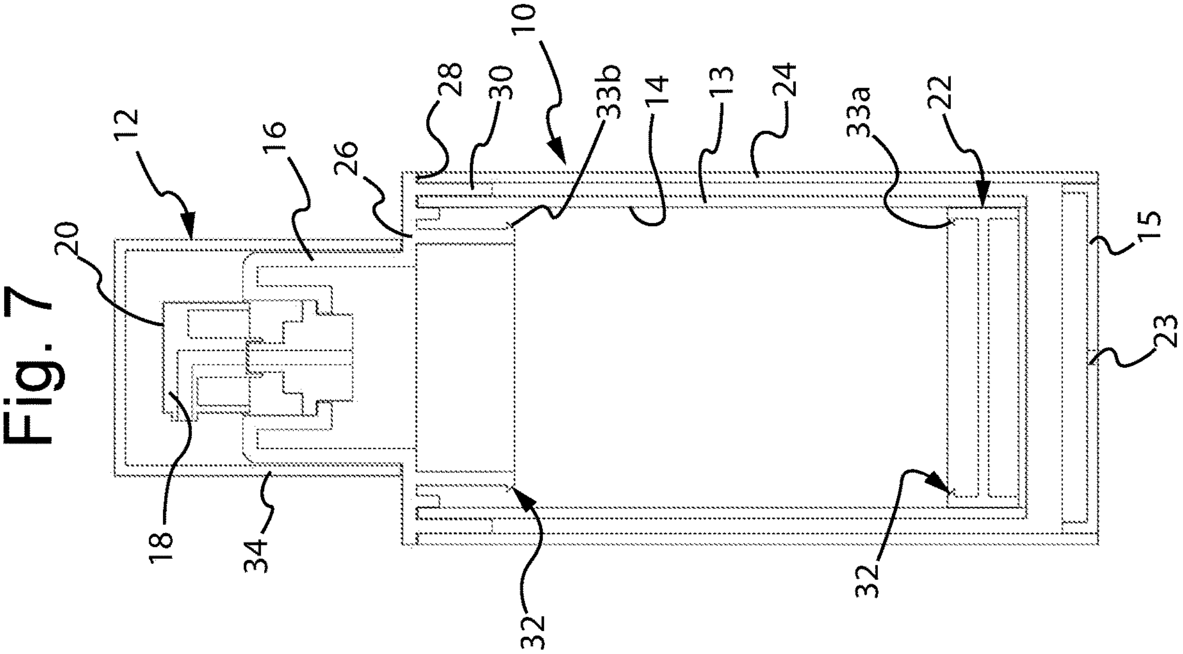
Figure 10:
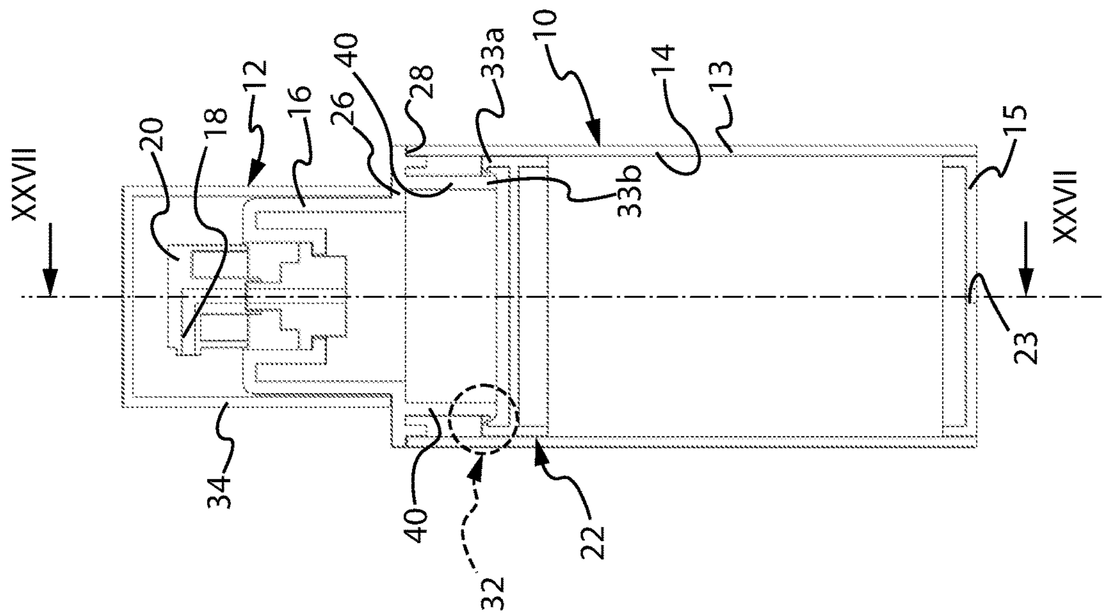
FIGS. 9 and 10 are longitudinal sectional views of the container shown in FIGS. 1 and 5, wherein such container is shown in a different operating position.
Figure 9:
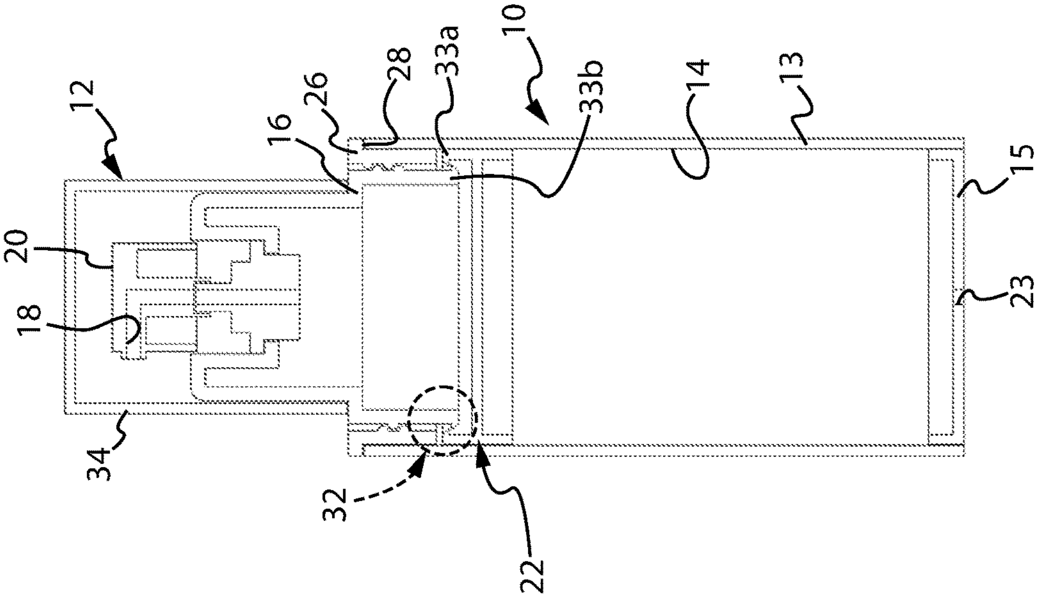
Figure 12:
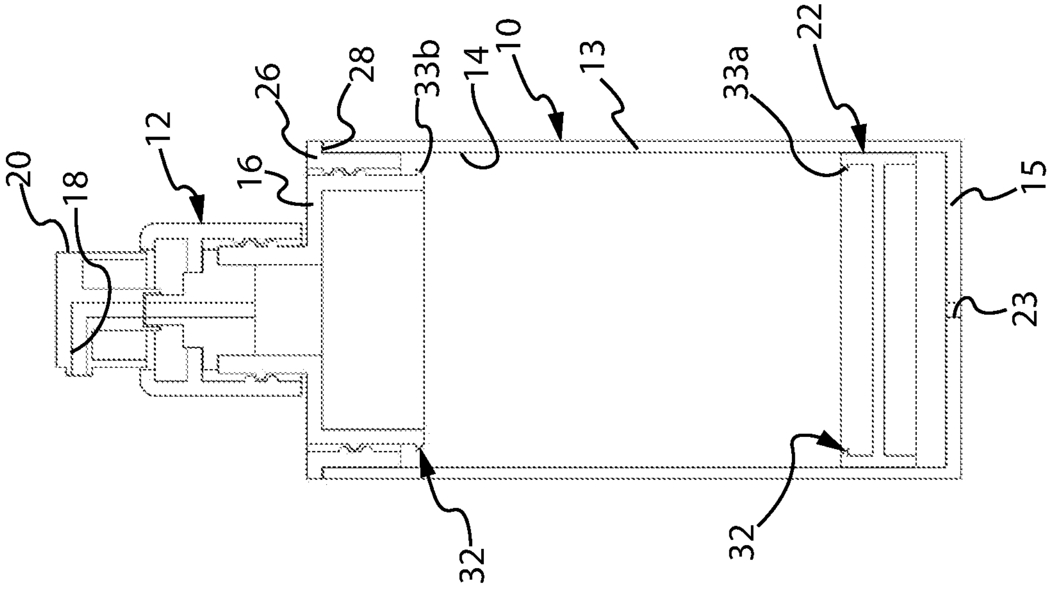
FIGS. 12 to 18 are longitudinal sectional views, each one showing a construction variant of the second embodiment shown in FIG. 12.

FIGS. 9 and 10 show the plunger 22 in the closer position, only with reference to the embodiment shown in FIG. 1 and to the construction variant thereof shown in FIG. 5. In all the other FIGS. 1-8 and 11-26, the various embodiments and construction variants thereof are represented with the plunger in the spaced-out position.

In the embodiments and construction variants thereof shown in FIGS. 1-18, the outlet nozzle 18 is carried by the dispenser 12, in particular by the dispensing or pumping head 16. In these construction variants, the pressure drop generated by the actuating means 20 pushes the plunger 22 towards the dispenser 12 and—more specifically—towards the dispensing head 16 and away from the base 15 (i.e. towards the top of the container 10). Conversely, in the embodiment shown in FIG. 19 and in the respective construction variants shown in FIGS. 20-26, the outlet nozzle 18 is carried by the base 15. In such construction variants, the pressure drop generated by the actuating means 20 pushes the plunger 22 towards the base 15 and away from the dispensing or pumping head 16 (i.e. towards the bottom of the container 10). In this case, the action performed by the user on the actuating means 20 will cause the product contained in the receptacle 14 to come out through the base 15, not through the dispensing or pumping head 16 of the dispenser 12.

In each one of the embodiments and construction variants of the present invention illustrated herein, the hollow vessel body 13 is substantially cylindrical and defines a substantially constant cross-section, in particular through the axial section in which the plunger 22 is able to slide. More particularly, the cross-section of the hollow vessel body 13 is substantially circular.

In each one of the embodiments and construction variants of the present invention illustrated herein, the hollow vessel body 13 is substantially transparent and is made of glass, e.g. vial glass. This measure permits to obtain a container 10 which is compatible with volatile substances and essences that, in the cosmetics field, need to be contained within amorphous and transparent material. At the same time, this measure makes it possible to obtain, within the hollow vessel body 13 of the container 10, a constant cross-section and adequate tolerances throughout all its height, thus allowing the plunger 22 to rise due to the pressure drop caused by the actuating means 20 (which substantially make a pump-type mechanical system).

Advantageously, in the embodiments illustrated in FIGS. 1-18 the hollow vessel body 13 is without a neck—or, more in general, without a narrowing—situated at the dispenser 12 (in particular, at the dispensing or pumping head 16 thereof) that carries the outlet nozzle 18. Also advantageously, in the embodiment shown in FIG. 19 and in the construction variants thereof shown in FIGS. 20-26, the hollow vessel body 13 is without a neck—or, more in general, without a narrowing—at the base 15 that carries the outlet nozzle 18.

Advantageously, but not necessarily, the hollow vessel body 13 has a substantially constant cross-section throughout its whole longitudinal or axial extension.

Figure 28:
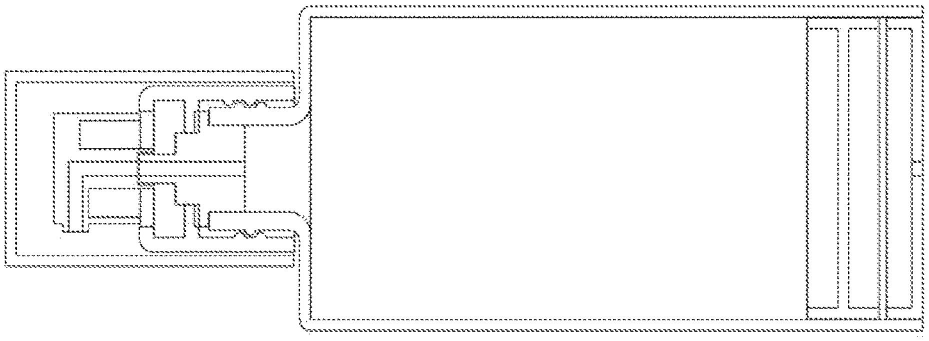
Fig. 28 (Prior Art)
FIG. 28 is a longitudinal sectional view of a container made in accordance with the prior art, wherein, differently from the present invention, the hollow vessel body is made by moulding a thermoplastic material.

As aforementioned, differently from the example of the prior art depicted in FIG. 28, the hollow vessel body 13 is not made of plastic by moulding a thermoplastic material, but is made of glass, particularly vial glass. For example, the process for manufacturing the hollow vessel body 13 can envisage that vial glass is obtained from glass tubes generally made by extrusion, which are subsequently thermoformed, in particular subjected to hot forming on rotary turrets. This process is also advantageous compared to glass forming processes using the so-called "press-press" technologies, in that it ensures better compliance with the tolerances necessary for proper operation and motion of the plunger 22.

In particular, in comparison with traditional processes, the closing of at least one of the ends of the container body is omitted to allow the plunger 22 to enter and exit through such end. In particular, neck forming can also be omitted, thus using only the semifinished extruded tube base. In this case, as will be described more in detail below, the plunger 22 can enter and exit also through the side where the dispensing or pumping head 16 is located.

Figure 11:
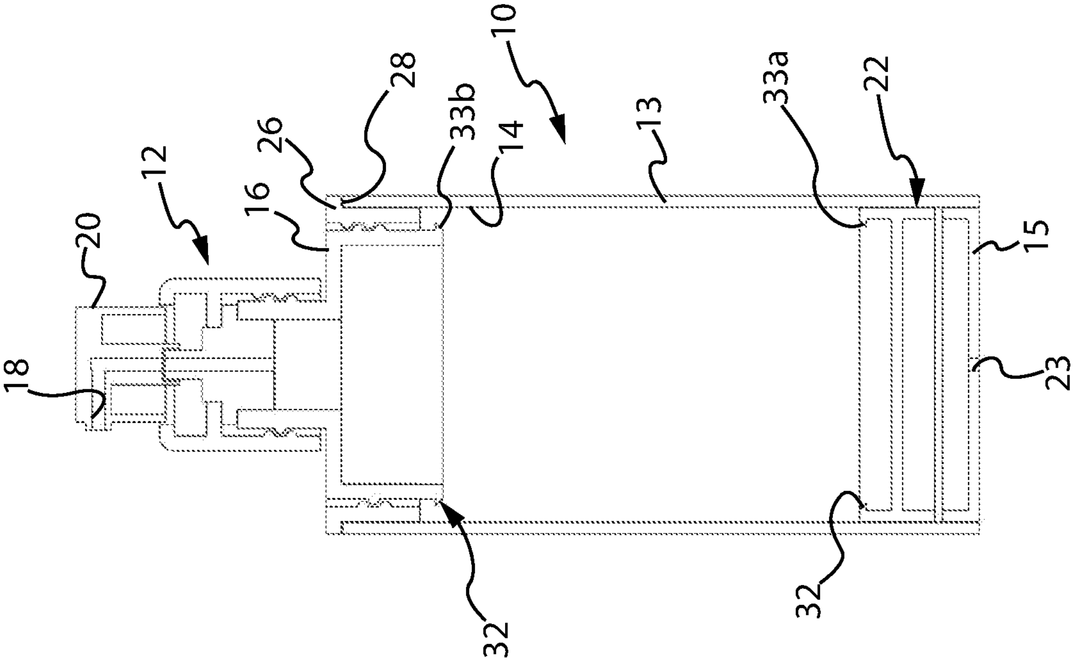
FIG. 11 is a longitudinal sectional view of a container provided with an airless dispenser for a cosmetic product made in accordance with a second exemplary embodiment of the present invention.
Figure 14:
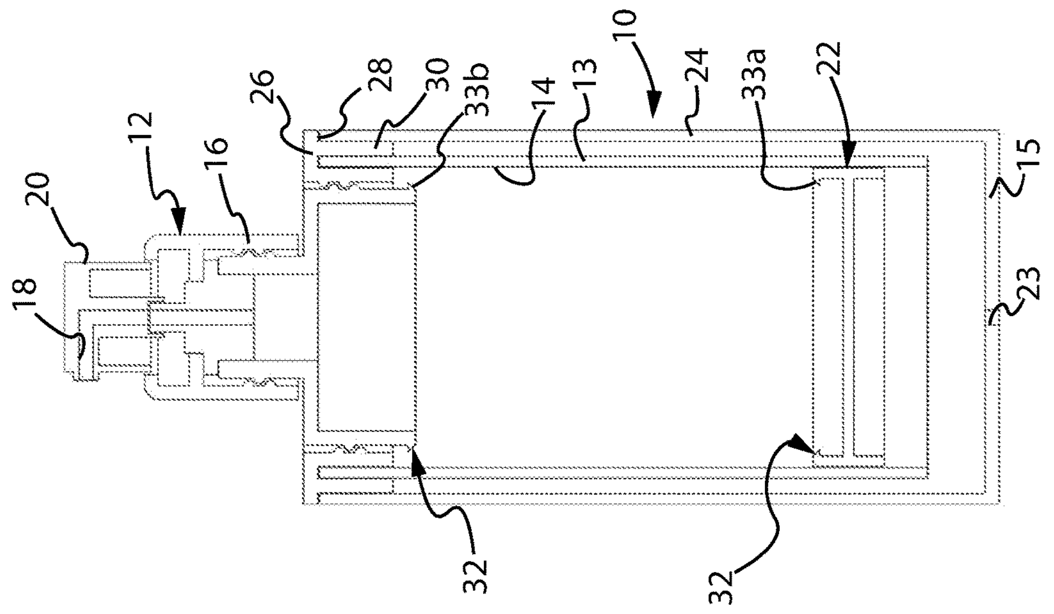
Figure 13:
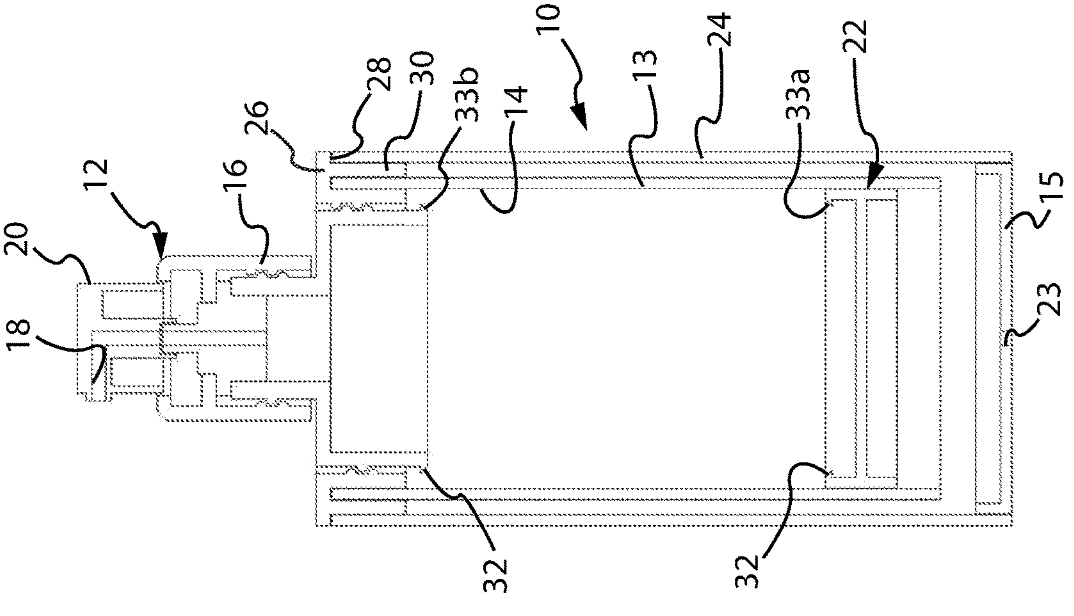
Figure 16:
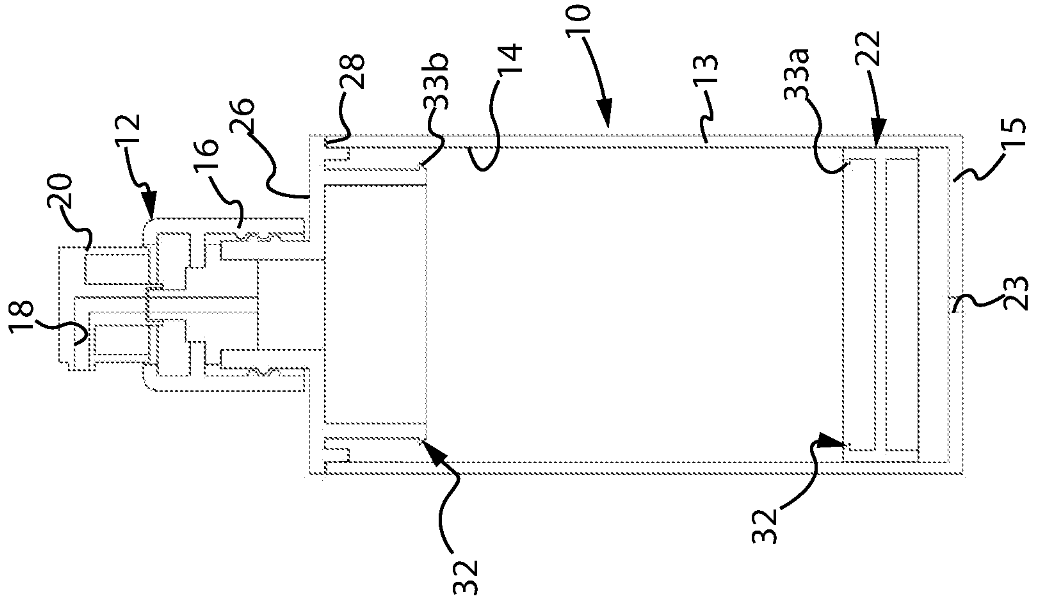
Figure 15:
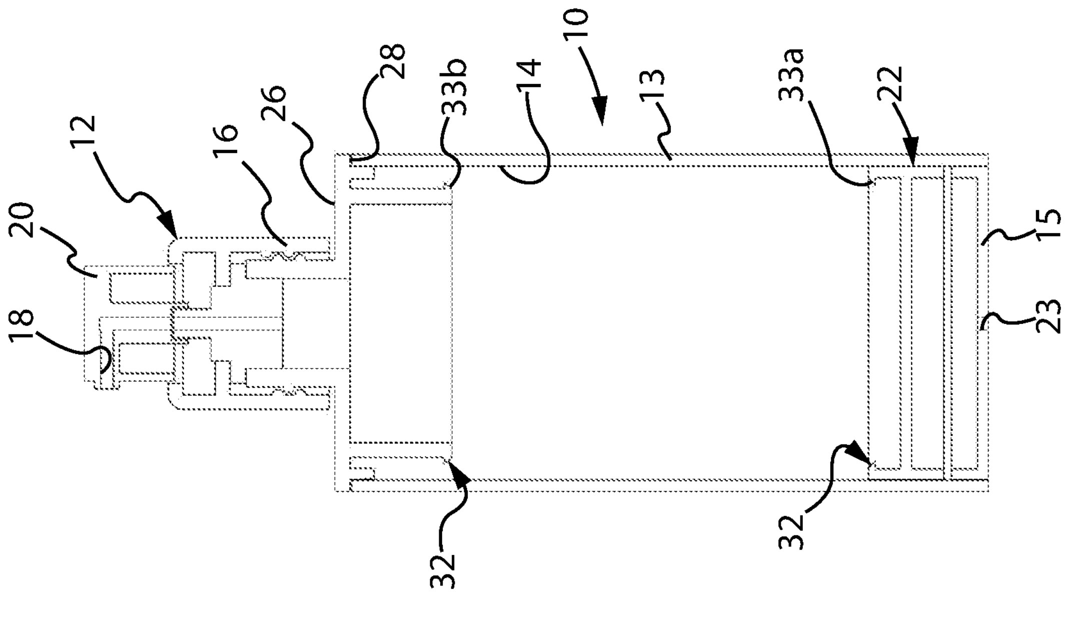
Figure 18:
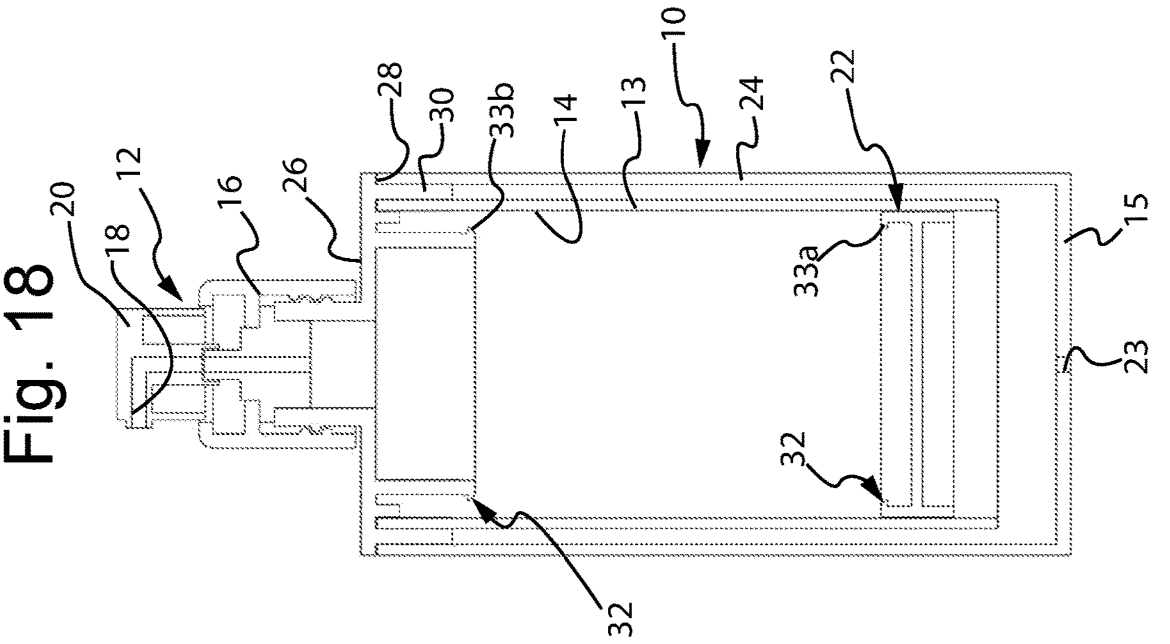
Figure 17:
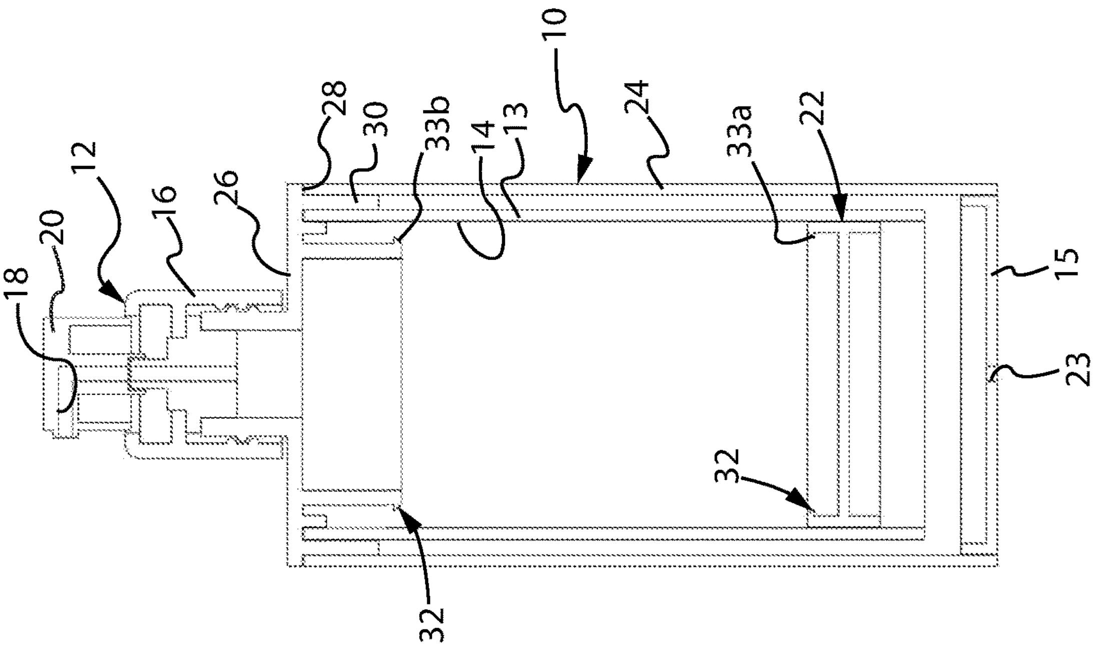
Figure 20:
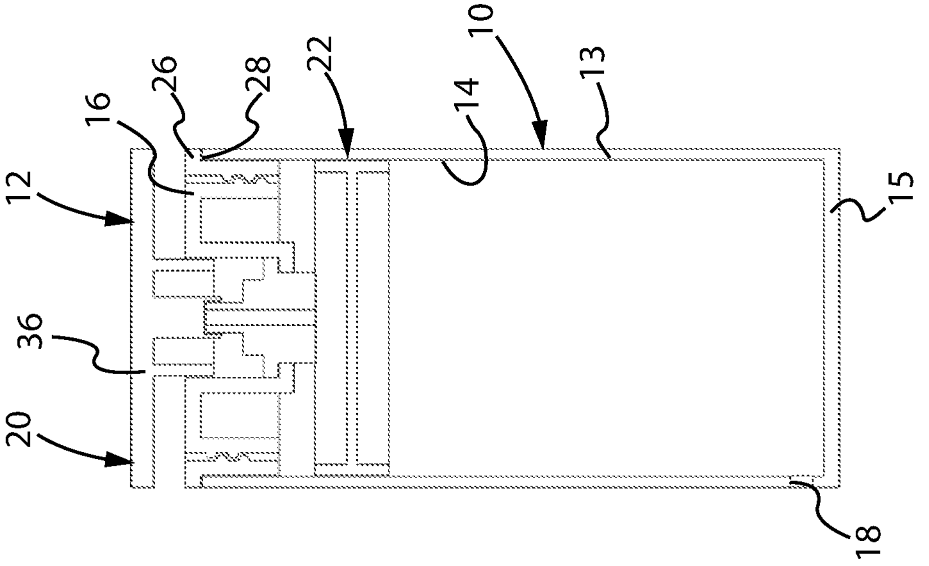
FIGS. 20 to 26 are longitudinal sectional views, each one showing a construction variant of the third embodiment shown in FIG. 20.
Figure 19:
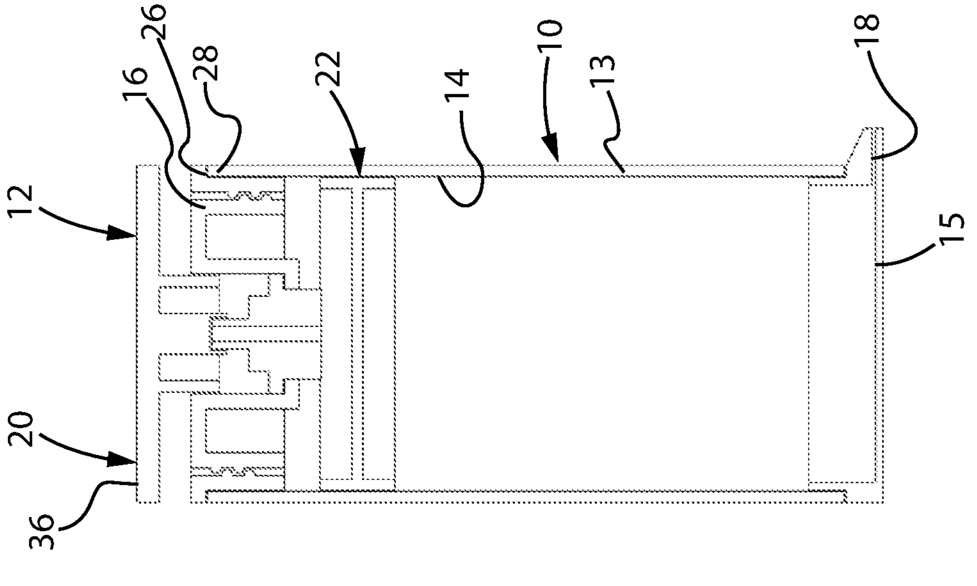
FIG. 19 is a longitudinal sectional view of a container provided with an airless dispenser for a cosmetic product made in accordance with a third exemplary embodiment of the present invention.
Figure 22:
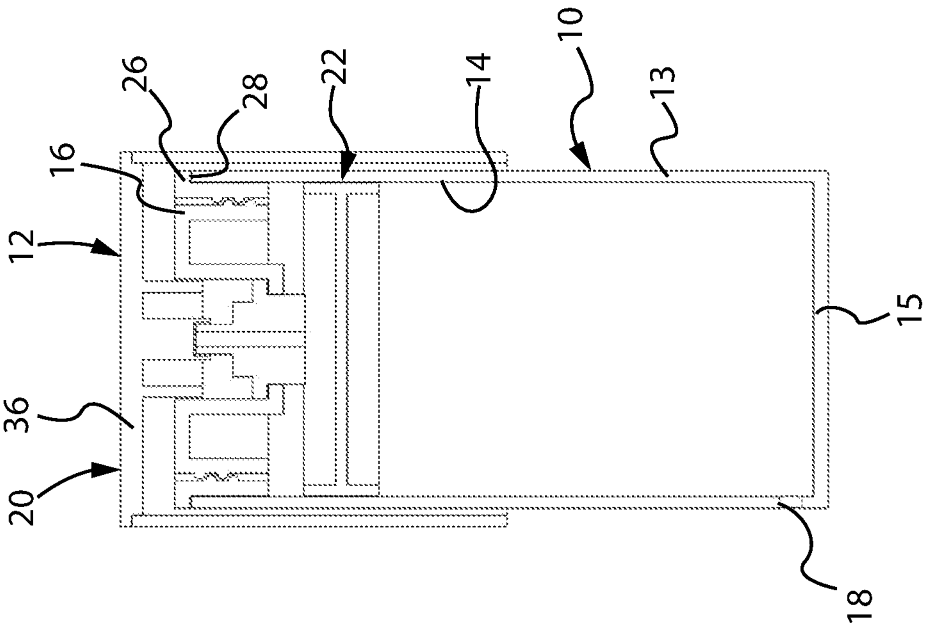
Figure 21:
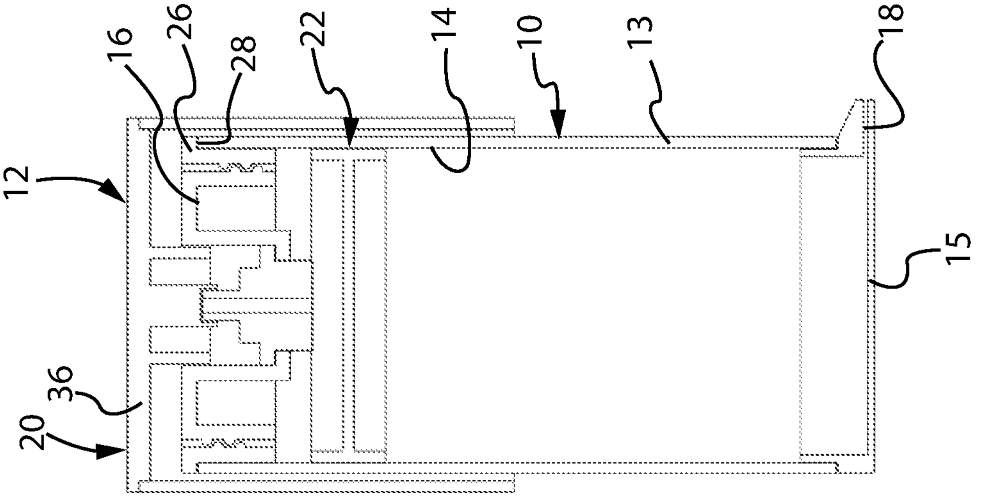
Figure 24:
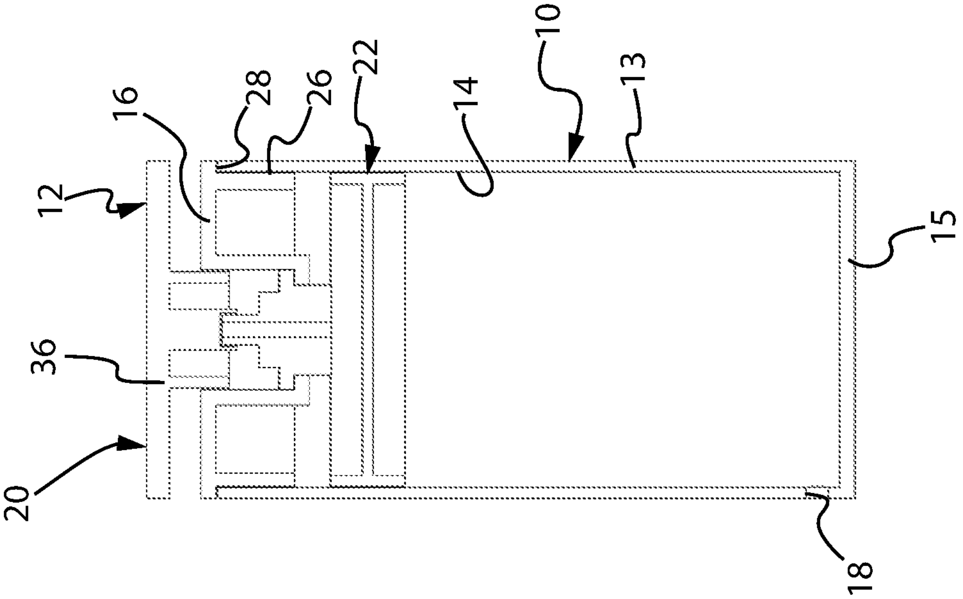
Figure 23:
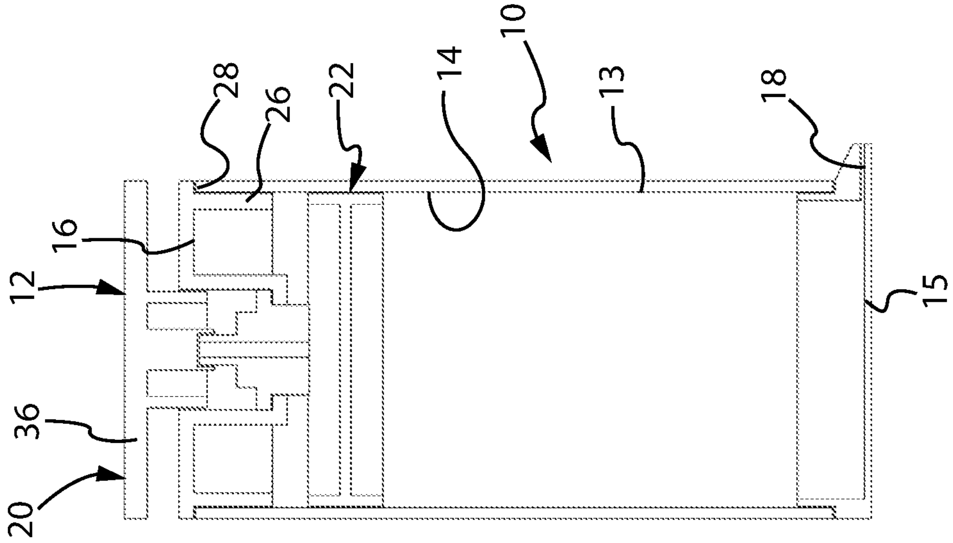
Figure 26:
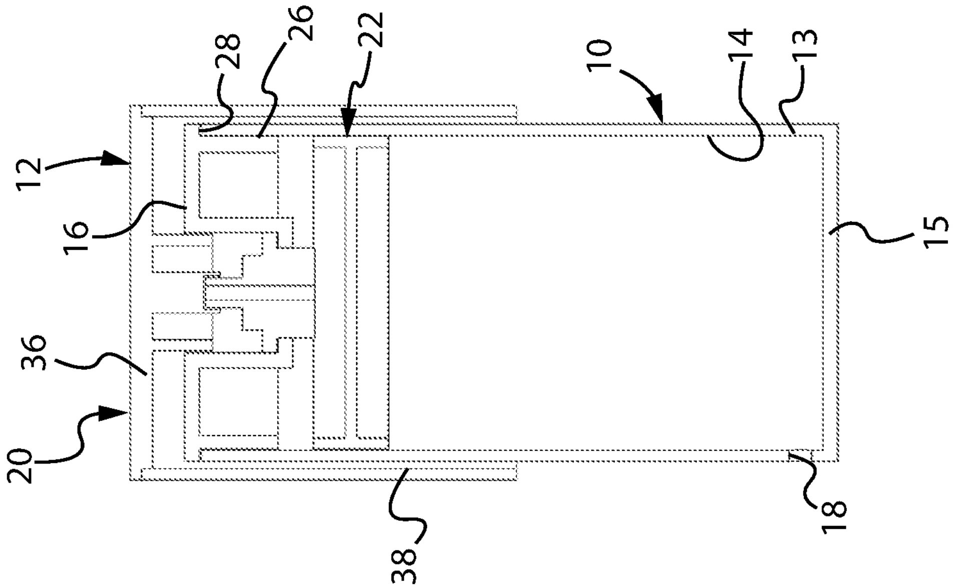
Figure 25:
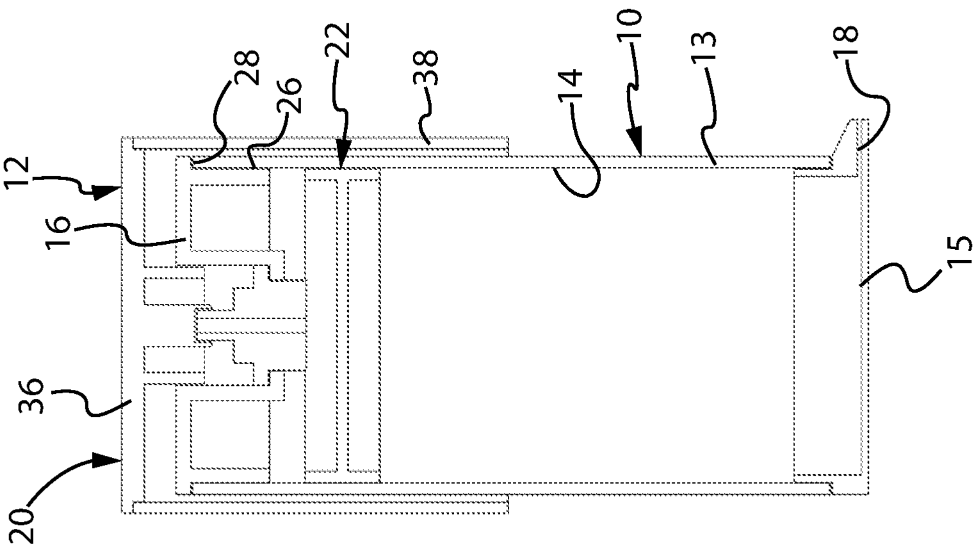

According to the embodiments shown in FIGS. 1, 11 and 19 and the construction variants thereof shown in FIGS. 2, 12 and 20-26, the container 10 essentially consists of the hollow vessel body 13. The base 15 of the container 10 thus forms the bottom of the hollow vessel body 13. In particular, the base 15 allows the passage of air inside the hollow vessel body 13 towards the plunger 22, which, in turn, is slidably and sealably mounted within the sidewalls of the hollow vessel body 13. For example, the base 15 can be provided with a hole or aperture 23. As it can be seen in the embodiments illustrated in FIGS. 1, 11 and 19 and in the construction variants illustrated in FIGS. 5, 15, 21, 23 and 25, the base 15 can be a component which is separate from the sidewalls of the hollow vessel body 13, to be subsequently assembled to the bottom thereof; as an alternative, in the construction variants shown in FIGS. 2, 6, 12, 16, 20, 22, 24, 26, the base 15 can be made as one piece with the hollow vessel body 13; for example, said base 15 can be made of a material which is different from the one used for the hollow vessel body 13—in particular, it can be made of plastic.

According to the construction variants shown in FIGS. 3, 4, 7, 8, 13, 14, 17 and 18, the container 10 further comprises an external casing 24 that surrounds the hollow vessel body 13, in particular in a transversally outer position. In other words, in such construction variants the container 10 substantially forms a hollow structure with a double sidewall provided by the hollow vessel body 13 and by the external casing 24 which surrounds the hollow vessel body 13. In such construction variants, the base 15 of the container 10 makes the bottom of the external casing 24, while the plunger 22 makes, in turn, a movable bottom of the hollow vessel body 13. The base 15 allows, therefore, the passage of air within the external casing 24, so as to communicate with the plunger 22, which in turn is slidably and sealably mounted within the sidewalls of the hollow vessel body 13. In such construction variants as well, for example, the base 15 can be provided with the central hole or aperture 23. As it can be seen in the construction variants shown in FIGS. 3, 7, 13 and 17, the base 15 can be a component which is separate from the sidewalls of the external casing 24, which is subsequently assembled to the bottom thereof; as an alternative, as it can be seen in the construction variants shown in FIGS. 4, 8, 14 and 18, the base 15 can be made in a single piece with the external casing 24.

The external casing 24 and its bottom 15 can be made of a material different from that of the hollow vessel body 13. For example, they can be made of opaque material. Still by way of example, they can be made of plastic.

In each one of the embodiments and construction variants of the present invention illustrated herein, the dispenser 12 preferably comprises a supporting ring 26 situated in a transversally (or radially) outer position, which allows fastening the dispensing or pumping head 16 to the container 10. The supporting ring 26 has, advantageously, a shoulder portion 28 in axial abutment with the end of the container 10. In particular, the shoulder portion 28 is in abutment with the end of the hollow vessel body 13. Even more in particular, if the external casing 24 is present, the shoulder portion 28 is also in axial abutment with the end of said external casing 24; preferably, between the ends of the hollow vessel body 13 and the external casing 28 there is a transversal spacer 30.

For example, the supporting ring 26 is made of plastic material.

According to the embodiments shown in FIGS. 1, 11 and 19 and the construction variants shown in FIGS. 2-4, 9, 12-14 and 20-22, the dispensing or pumping head 16 is a component that is separate from the supporting ring 26 and is located in a transversally (or radially) internal position relative to the supporting ring 26. In such variants, the dispensing or pumping head 16 can be assembled to the supporting ring 26, e.g. by means of a threaded coupling. In the construction variants shown in FIGS. 5-8, 10, 15-18, 23-26, the dispensing or pumping head 16 and the supporting ring 26 are made in a single piece.

In the embodiments and construction variants thereof illustrated in FIGS. 1 to 18, the plunger 22 is preferably provided with coupling means 32 configured for coupling to the rest of the dispenser 12 when the plunger 22 is in the above-described closer position. In particular, the coupling means 32 make the plunger 22 integral with the rest of the dispenser 12, in particular with the dispensing head 16 and/or with the supporting ring 26. In this manner, when the plunger 22 is in the closer position (which means that the cosmetic product in the receptacle 14 is substantially exhausted), it is extractable from the container 10 an integral assembly including the dispensing head 16, the plunger 22 and the supporting ring 26, thus facilitating the separation and disposal thereof for a subsequent recycling.

For example, the coupling means 32 include a quick-coupling mechanism that engages the plunger 22 with the dispensing head 16 and/or the supporting ring 26.

In the embodiments and construction variants thereof illustrated in FIGS. 1 to 18, the quick-coupling mechanism of the coupling means 32 includes, by way of example, one or more inclined profiles **33*a* provided on the plunger 22 and, respectively, one or more complementary profiles 33*b* provided, in turn, on the dispensing head 16 and/or on the supporting ring 26, and operationally facing towards the inclined profiles 33*a***.

In particular, each one of the profiles **33*a*, 33*b* has an outline which, in an axial cross-section, is shaped substantially like a tooth. As the plunger 22 approaches the closer position, each inclined profile 33*a* comes in abutment with the respective complementary profile 33*b* and slides against it by means of mechanical interference. When the plunger 22 reaches the closer position, every inclined profile 33*a* axially overcomes the corresponding complementary profile 33*b*** and comes in snap engagement with it.

Figure 27:
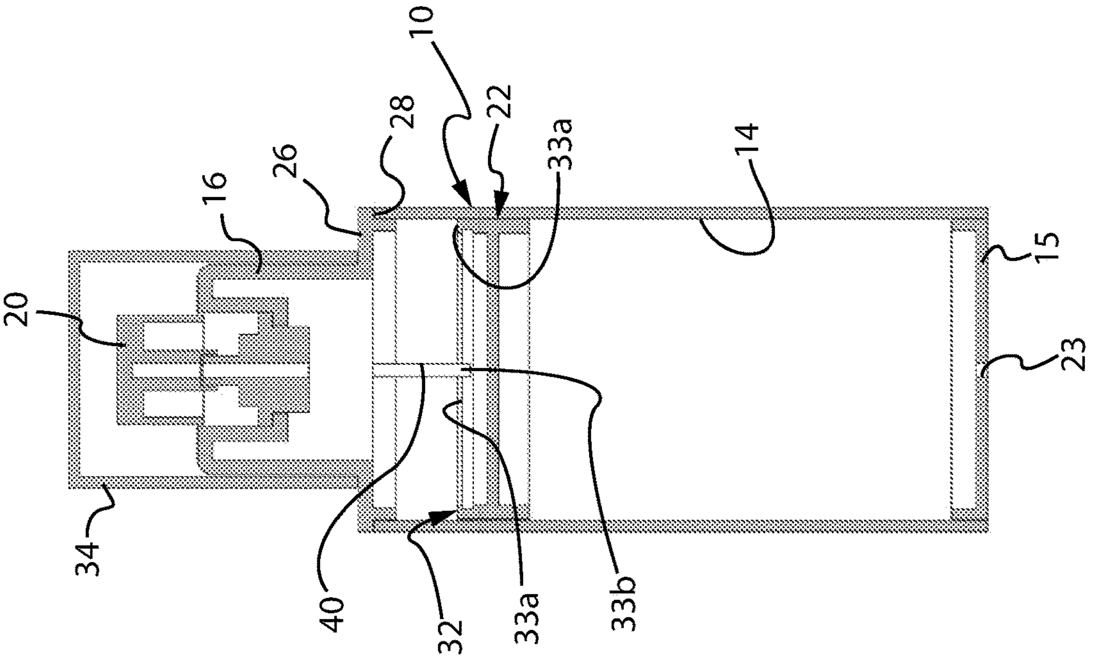
FIG. 27 is a longitudinal sectional view taken along line XXVII-XXVII of FIG. 10, that schematically shows a way by means of which the coupling means of a plunger can be provided, such means being able to be used in a container made in accordance with the various embodiments and construction variants thereof shown in each one of the preceding figures.

With particular reference to FIG. 27, it is shown a longitudinal section of the container 10 according to the construction variant illustrated in FIG. 10, which provides a better view—from another elevation perspective—of an exemplary implementation of the coupling means 32. Such longitudinal section refers to FIG. 10, but the technical features illustrated therein and described below are applicable to any embodiment and construction variant of the container 10.

In FIG. 27, the inclined profile **33*a* comprises an annular or arched extension carried by the plunger 22 and developing in a substantially continuous manner around the movement axis of said plunger 22. In particular, said inclined profile 33*a* develops transversally or radially inwards. There are also a plurality of complementary profiles 33*b*, each one carried by the end of a respective appendix 40 protruding from the dispensing or pumping head 16 (or, as an alternative, from the associated supporting ring 26) within the receptacle 14 and towards the plunger 22. In particular, the appendices 40 (only one of which is visible in FIG. 27) are angularly spaced apart evenly; in the construction variant visible in FIGS. 10 and 27, such appendices 40** are two and are situated in diametrical opposite positions.

In the embodiment shown in FIG. 1 and in the construction variants shown in FIGS. 2-10, the dispensing head 16 comprises a protective cap 34 removably mounted over it. In particular, when the protective cap 34 is mounted over the dispensing head, it covers the actuating means 20, e.g. to prevent them from being unintentionally operated.

In the construction variants shown in FIGS. 21, 22, 25 and 26, wherein the outlet nozzle 18 is carried by the base 15, the actuating means 20 can include a thrust plate 36 intended for creating a pressure drop that pushes the plunger 22 towards the base 15. The thrust plate 36 can optionally have a peripheral edge 38 protruding axially towards the base 15 and laterally surrounding at least an axial segment of the container 10, in particular of the hollow vessel body 13.

Naturally, without prejudice to the principle of the invention, the embodiments and the implementation details may be extensively varied from those described and illustrated herein by way of non-limiting example, without however departing from the scope of the invention as set out in the appended claims.

For example, the technical features that differentiate the various embodiments and variants thereof described and illustrated herein are freely interchangeable, whenever compatible.

In particular, when the outlet nozzle 18 is carried by the base 15 (e.g. as shown in FIGS. 19, 21, 23 and 25), the plunger 22 and the base 15 can be provided with the same coupling means as those previously described and illustrated with reference to the embodiments shown in FIGS. 1-18 and 20. For the sake of conciseness, such coupling means will not be described any further herein, and reference should be made, mutatis mutandis, to the above description of such embodiments.

The invention claimed is:

1. A container provided with a dispenser of the airless type for a cosmetic product;
- said container comprising a hollow vessel body internally defining a receptacle configured for sealably containing a cosmetic product; said container further comprising a base to rest on a supporting surface;
- said dispenser comprises a dispensing or pumping head mounted at one end of said hollow vessel body and communicating with the receptacle for dispensing the cosmetic product; said dispenser comprising an actuator associated with said dispensing or pumping head and configured to be operated by a user, to cause a pressure drop inside said receptacle, thus letting out a desired quantity of cosmetic product through an outlet nozzle when said actuator is operated;
- said container further comprising a plunger slidably and sealably mounted in the receptacle and configured to be pushed from a spaced-out position towards a closer position relative to the outlet nozzle due to the pressure drop generated by operation of actuator;
- wherein said hollow vessel body is substantially transparent and made of glass, being substantially cylindrical and defining a substantially constant cross-section through an axial section in which said plunger-slides;
- said outlet nozzle is carried by at least one between said dispenser and said base;
- wherein said plunger is provided with a coupler which couples said plunger to, making said plunger integral with, the at least one between said dispenser and said base carrying said outlet nozzle, when said plunger is in said closer position; and
- wherein, when the plunger is in said closer position, said plunger and the dispenser or the base coupled thereto form an integral assembly extractable as one piece from said hollow vessel body; and
- wherein said container comprises an external casing that surrounds said hollow vessel body.

2. The container according to claim 1, wherein said hollow vessel body is without a neck or narrowing situated at the least one between said dispenser and said base.

3. The container according to claim 1, wherein said hollow vessel body has a substantially constant cross-section throughout a whole longitudinal or axial extension.

4. The container according to claim 1, wherein said container essentially consists of said hollow vessel body, and said base forms a bottom of said hollow vessel.

5. The container according to claim 4, wherein said base is made in a single piece with said hollow vessel body.

6. The container according to claim 4, wherein said base is a component which is separate from said hollow vessel body.

7. The container according to claim 1, wherein said base is made in a single piece with said external casing.

8. The container according to claim 1, wherein said base is a component which is separate from said external casing.

9. The container according to claim 1, wherein said dispenser further comprises a supporting ring configured to allow fastening the dispensing or pumping head to said hollow vessel body.

10. The container according to claim 9, wherein said supporting ring is made in a single piece with said dispensing or pumping head.

11. The container according to claim 9, wherein said supporting ring is a component which is separate from said dispensing or pumping head.

12. The container according to claim 1, wherein said coupler makes the plunger integral with at least one between said dispensing head and said supporting ring in said closer position.

13. The container according to claim 12, wherein said coupler includes a quick-coupling mechanism that engages said plunger with at least one between said dispensing or pumping head and said supporting ring.

14. A container provided with a dispenser of the airless type for a cosmetic product;
- said container comprising a hollow vessel body internally defining a receptacle configured for sealably containing a cosmetic product; said container further comprising a base to rest on a supporting surface;
- said dispenser comprises a dispensing or pumping head mounted at one end of said hollow vessel body and communicating with the receptacle for dispensing the cosmetic product; said dispenser comprising an actuator associated with said dispensing or pumping head and configured to be operated by a user, to cause a pressure drop inside said receptacle, thus letting out a desired quantity of cosmetic product through an outlet nozzle when said actuator is operated;
- said container further comprising a plunger slidably and sealably mounted in the receptacle and configured to be pushed from a spaced-out position towards a closer position relative to the outlet nozzle due to the pressure drop generated by operation of actuator;
- wherein said hollow vessel body is substantially transparent and made of glass, being substantially cylindrical and defining a substantially constant cross-section through an axial section in which said plunger-slides;
- said outlet nozzle is carried by at least one between said dispenser and said base;
- wherein said plunger is provided with a coupler which couples said plunger to, making said plunger integral with, the at least one between said dispenser and said base carrying said outlet nozzle, when said plunger is in said closer position; and wherein, when the plunger is in said closer position, said plunger and the dispenser or the base coupled thereto form an integral assembly extractable as one piece from said hollow vessel body;

wherein said coupler makes the plunger integral with at least one between said dispensing head and said supporting ring in said closer position;

wherein said coupler includes a quick-coupling mechanism that engages said plunger with at least one between said dispensing or pumping head and said supporting ring; and wherein the quick coupling mechanism includes at least one inclined profile provided on the plunger and at least one complementary profile provided on at least one between the dispensing head and the supporting ring; said at least one complementary profile operationally facing towards said inclined profile.

15. The container according to claim 1, wherein said dispensing head comprises a protective cap removably mounted over said actuator.

16. A container provided with a dispenser of the airless type for a cosmetic product;

said container comprising a hollow vessel body internally defining a receptacle configured for sealably containing a cosmetic product said container further comprising a base to rest on a supporting surface;

said dispenser comprises a dispensing or pumping head mounted at one end of said hollow vessel body and communicating with the receptacle for dispensing the cosmetic product; said dispenser comprising an actuator associated with said dispensing or pumping head and configured to be operated by a user, to cause a pressure drop inside said receptacle, thus letting out a desired quantity of cosmetic product through an outlet nozzle when said actuator is operated;

said container further comprising a plunger slidably and sealably mounted in the receptacle and configured to be pushed from a spaced-out position towards a closer position relative to the outlet nozzle due to the pressure drop generated by operation of actuator;

wherein said hollow vessel body is substantially transparent and made of glass, being substantially cylindrical and defining a substantially constant cross-section through an axial section in which said plunger-slides;

said outlet nozzle is carried by at least one between said dispenser and said base;

wherein said plunger is provided with a coupler which couples said plunger to, making said plunger integral with, the at least one between said dispenser and said base carrying said outlet nozzle, when said plunger is in said closer position; and wherein, when the plunger is in said closer position, said plunger and the dispenser or the base coupled thereto form an integral assembly extractable as one piece from said hollow vessel body; and wherein said base carries said outlet nozzle and has an aperture or hole through which air passes.

* * * * *